United States Patent
Bae et al.

(10) Patent No.: US 7,848,690 B2
(45) Date of Patent: Dec. 7, 2010

(54) IMAGE FORMING APPARATUS AND AUTO COLOR REGISTRATION METHOD THEREOF

(75) Inventors: Hyo-joon Bae, Seoul (KR); Beom-ro Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 126 days.

(21) Appl. No.: 12/172,292

(22) Filed: Jul. 14, 2008

(65) Prior Publication Data
US 2009/0035030 A1 Feb. 5, 2009

(30) Foreign Application Priority Data
Jul. 31, 2007 (KR) .............. 10-2007-0077086
Apr. 15, 2008 (KR) .............. 10-2008-0034867

(51) Int. Cl.
G03G 15/01 (2006.01)
(52) U.S. Cl. .............. 399/301; 399/49
(58) Field of Classification Search .............. 399/301, 399/49; 347/116
See application file for complete search history.

(56) References Cited

U.S. PATENT DOCUMENTS 7,627,277 B2 * 12/2009 Maeda .............. 399/301
2001/0004425 A1 6/2001 Shinohara et al.
2006/0153603 A1 * 7/2006 Nishikawa et al. .......... 399/301
2007/0110485 A1 * 5/2007 Katsuhara et al. .......... 399/301
2008/0292368 A1 * 11/2008 Baretsky et al. .............. 399/301

FOREIGN PATENT DOCUMENTS

| EP | 0907113 | 4/1999 |
|---|---|---|
| EP | 1189431 | 3/2002 |
| JP | 2000-305340 | 11/2000 |
| JP | 2004-246386 | 9/2004 |
| JP | 2007-225992 | 9/2007 |

OTHER PUBLICATIONS

European Search Report issued Jul. 20, 2009 in EP Application No. 08161346.5.

* cited by examiner

*Primary Examiner*—Sophia S Chen
(74) *Attorney, Agent, or Firm*—Stanzione & Kim, LLP

(57) ABSTRACT

A color registration method of an image forming apparatus, including forming a plurality of front detection marks corresponding to a plurality of colors on a transfer belt, forming a first rear detection mark to at least one of the plurality of colors, except at least one of the plurality of colors, using a color registration reference, and performing auto color registration (ACR) to align the colors on the basis of the first rear detection mark.

30 Claims, 14 Drawing Sheets

IMAGE FORMING APPARATUS AND AUTO COLOR REGISTRATION METHOD THEREOF

CROSS-REFERENCE TO RELATED APPLICATIONS

This application claims priority from Korean Patent Applications No. 10-2007-0077086, filed on Jul. 31, 2007 and No. 10-2008-0034867, filed on Apr. 15, 2008 in the Korean Intellectual Property Office, the disclosures of which are incorporated herein by reference in their entirety.

BACKGROUND OF THE INVENTION

1. Field of the Invention

The present general inventive concept relates to an image forming apparatus and an auto color registration method thereof, and more particularly, to an image forming apparatus having an improved auto color registration function and an auto color registration method thereof.

2. Description of the Related Art

An image forming apparatus generally includes a printer, a scanner, a multifunction device, etc. to form a color image.

The image forming apparatus includes a laser scanning unit (LSU) which is provided corresponding to a plurality of colors, and an image forming unit which includes a plurality of photosensitive bodies, etc. Here, the plurality of photosensitive bodies is arranged along a moving path of a printing medium which is transferred by a transfer unit such as a transfer belt.

For precise printing of a color image, positions where image transfer to the printing medium starts should correspond with each other for the plurality of colors, and likewise, positions where the image transfer to the printing medium ends should correspond with each other for the plurality of colors. To this end, the image forming apparatus performs an auto color registration (ACR) function. The ACR is performed to inspect whether or not the images of the plurality of colors are correctly registered and to automatically correct possible mis-registration.

Particularly, the image forming apparatus detects positions of a plurality of detection marks formed on the transfer belt corresponding to the plurality of colors, and performs the ACR for all the plurality of colors if any color is shifted out of position.

Typically, several sets of the plurality of detection marks are necessary for the ACR to determine whether or not the position correction should be performed, and thus, a lot of developers are needed.

Further, even if detection marks corresponding to any one color are shifted out of position, the ACR should be performed of all the colors, thereby increasing consumption of the developer.

Furthermore, the developer consumption increase causes increase in costs for new developer purchase and waste developer disposal, and various problems like developer scattering, and life shortening of the apparatus and environmental contamination.

SUMMARY OF THE INVENTION

The present general inventive concept can provide an image forming apparatus and a color registration method thereof, which can perform an auto color registration (ACR) function to at least one of the colors, except at least one of the other colors, among a plurality of colors of the image forming apparatus to decrease developer consumption.

Additional aspects and/or utilities of the present general inventive concept will be set forth in part in the description which follows and, in part, will be obvious from the description, or may be learned by practice of the present general inventive concept.

The foregoing and/or other aspects and utilities of the present general inventive concept can be achieved by providing a color registration method of an image forming apparatus, including forming a plurality of front detection marks corresponding to a plurality of colors on a transfer belt, forming a first rear detection mark corresponding to at least one of the colors, except at least one of the other colors, using a color registration reference, and performing auto color registration (ACR) on the basis of the first rear detection mark.

The color registration reference may comprise one color previously set among the plurality of colors.

The color registration reference may comprise one of two or more colors of which registration deviations between two or more front detection marks corresponding to the plurality of colors are within a first error range.

The method may further comprise determining the number of colors of which the registration deviation between the two or more corresponding front detection marks among the plurality of colors is within the first error range, wherein a color having the most other colors of which the registration deviation is within the first error range is selected as the color registration reference based on the determination result.

The method may further comprise selecting at least one color as the registration reference for the ACR among the two or more colors, based on the registration deviation previously obtained corresponding to each color.

The method may further comprise determining whether there exists any color among the plurality of colors of which the registration deviation between the plurality of front detection marks is beyond a second error range larger than the first error range, and forming a second rear detection mark to be spaced by a predetermined difference from the front detection mark of the color of which the registration deviation is beyond the second error range, wherein the forming the first rear detection mark comprises forming the first rear detection mark with regard to the other colors except the color of which the registration deviation between the second rear detection marks is within the first error range.

The front detection mark may comprise two detection mark lines that are different in spaced distance at opposite ends thereof.

The color registration reference may comprise positions of a detection unit that detects the front detection marks.

The method may further comprise determining whether there exists any color among the plurality of colors of which the registration deviation between positions of a detection unit and the plurality of front detection marks is beyond a second error range larger than the first error range; and forming a second rear detection mark to be spaced at a predetermined position from the front detection mark of the color of which the registration deviation is beyond the second error range, wherein the forming the first rear detection mark comprises forming the first rear detection mark with regard to the other colors except the color of which the registration deviation between the second rear detection marks is within the first error range.

The plurality of front detection marks may be formed corresponding to at least four colors.

At least one set of the plural front detection marks may be formed.

The method may further comprise storing result data of the ACR.

The result data may comprise a registration deviation based on the ACR, and the storing the result data comprises updating the result data with the registration deviation based on the ACR.

The foregoing and/or other aspects and utilities of the present general inventive concept can also be achieved by providing an image forming apparatus comprising a transfer unit comprising a transfer belt, an image forming unit to form a plurality of detection marks corresponding to a plurality of colors on the transfer belt, a detection unit to detect positions of the detection marks, and a controller to form a plurality of front detection marks corresponding to a plurality of colors on the transfer belt, to form a first rear detection mark corresponding to at least one of the colors, except at least one of the other colors, using a color registration reference based on detection results of the detection unit, and to perform auto color registration (ACR) on the basis of the first rear detection mark.

The color registration reference may comprise one color previously set among the plurality of colors.

The color registration reference may comprise one of two or more colors of which registration deviations between two or more front detection marks corresponding to the plurality of colors are within a first error range.

The controller may determine the number of colors of which the registration deviation between the two or more corresponding front detection marks among the plurality of colors is within the first error range, and selects a color having the most other colors of which the registration deviation is within the first error range as the color registration reference based on the determination result.

The controller may select at least one color as the registration reference for the ACR among the two or more colors, based on the registration deviation previously obtained corresponding to each color.

The controller may determine whether there exists any color among the plurality of colors of which the registration deviation between the plurality of front detection marks is beyond a second error range larger than the first error range, forms a second rear detection mark to be spaced by a predetermined difference from the front detection mark of the color of which the registration deviation is beyond the second error range, and forms the first rear detection mark with regard to the other colors except the color of which the registration deviation between the second rear detection marks is within the first error range.

The front detection mark may comprise two detection mark lines that are different in spaced distance at opposite ends thereof.

The color registration reference may comprise positions of a detection unit that detects the front detection marks.

The image forming apparatus may further comprise a storage unit to store result data of the ACR.

The detection unit may comprise an optical sensor comprising a light emitting part and a light receiving part.

The foregoing and/or other aspects and utilities of the present general inventive concept can also be achieved by providing an image forming apparatus, including a light exposing unit to form front and rear detection marks corresponding to starting and ending positions of a plurality of colors, respectively, a detection unit to detect positions of the front and rear detection marks, and a controller to determine whether there exists any color of which the front detection marks are positioned beyond a first error range, and if so, to control the light emitting unit to form a rear detection mark only with respect to the any color, and to adjust the starting and/or ending positions of the any color based on the position of the rear detection mark relative to a color registration reference.

The controller may calculate a registration deviation among the plurality of colors based on the position of the front detection marks, may determine the number of colors of which the registration deviation is within the first error range, may select one of the number of colors having the lowest registration deviation as the color registration reference, and may form a rear detection mark with respect to the color registration reference in addition to the rear detection marks corresponding to the any color.

The rear detection marks may be formed with respect to at least one of the plurality of colors of which the front detection marks are within the first error range.

The controller may determine whether there exists any color of which the front detection marks are positioned beyond a second error range greater than the first error range, and if so, to control the light emitting unit to form second rear detection marks with respect to the any color of which the front detection marks are positioned beyond the second error range, wherein the second rear detection marks are spaced apart from the rear detection marks by a predetermined distance, and wherein the starting and/or ending positions of the any color of which the front detection marks are positioned beyond the second error range are adjusted based on the position of the second rear detection marks.

The second rear detection marks may be positioned with respect to the rear detection marks within the second error range.

The foregoing and/or other aspects and utilities of the present general inventive concept can also be achieved by providing a color registration method of an image forming apparatus, the method including forming front detection marks corresponding to starting positions of a plurality of colors, determining whether there exists any color of which the front detection marks are positioned beyond a first error range, and if so, forming first rear detection marks corresponding to ending positions only with respect to the any color, and adjusting the starting and/or ending positions of the any color based on the position of the first rear detection marks relative to a color registration reference.

The method may further include determining whether there exists any color of which the front detection marks are further positioned beyond a second error range greater than the first error range, and if so, forming second rear detection marks with respect to the any color of which the front detection marks are positioned beyond the second error range, wherein the second rear detection marks are spaced apart from the first rear detection marks by a predetermined distance, and wherein the starting and/or ending positions of the any color of which the front detection marks are positioned beyond the second error range are adjusted based on the position of the second rear detection marks.

The method may further include calculating a registration deviation among the plurality of colors based on the position of the front detection marks, determining the number of colors of which the registration deviation is within the first error range, selecting one of the number of colors having the lowest registration deviation as the color registration reference, and forming a rear detection mark with respect to the color registration reference in addition to the rear detection marks corresponding to the any color of which the front detection marks are positioned beyond the first error range.

The foregoing and/or other aspects and utilities of the present general inventive concept can also be achieved by providing an image forming apparatus, including a transfer belt, an image forming unit to form a plurality of detection marks corresponding to a plurality of color images on the transfer belt, and a control unit to control color registration of at least one of the plurality of color images according to a characteristic of the detection marks corresponding to the at least one color except at least one of the other colors.

The plurality of detection marks may be formed before the color images are formed.

The detection marks may include front and rear detection marks corresponding to starting and ending positions of the plurality of color images, respectively.

The characteristic of the detection marks may include a position of the detection marks with respect to a registration reference.

The characteristic of the detection marks may further include a distance between two or more detection marks of each color image with respect to the registration reference.

BRIEF DESCRIPTION OF THE DRAWINGS

These and/or other aspects and utilities of the present general inventive concept will become apparent and more readily appreciated from the following description of the embodiments, taken in conjunction with the accompanying drawings, of which.

DETAILED DESCRIPTION OF THE PREFERRED EMBODIMENTS

Figure 1:
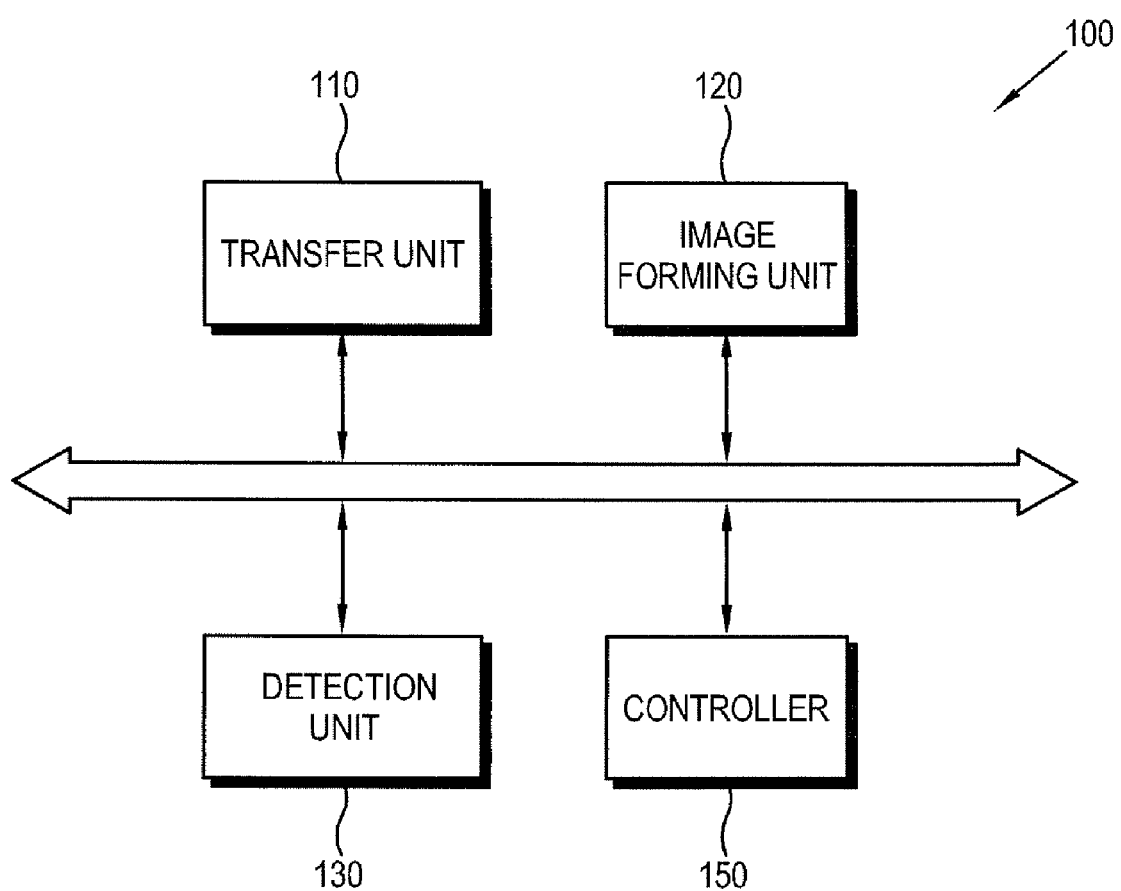
FIGS. 1 and 2 are block diagrams illustrating an image forming apparatus according to an embodiment of the present general inventive concept.

Reference will now be made in detail to the embodiments of the present general inventive concept, examples of which are illustrated in the accompanying drawings, wherein like reference numerals refer to like elements throughout. The exemplary embodiments are described below so as to explain the present general inventive concept by referring to the figures.

Figure 2:
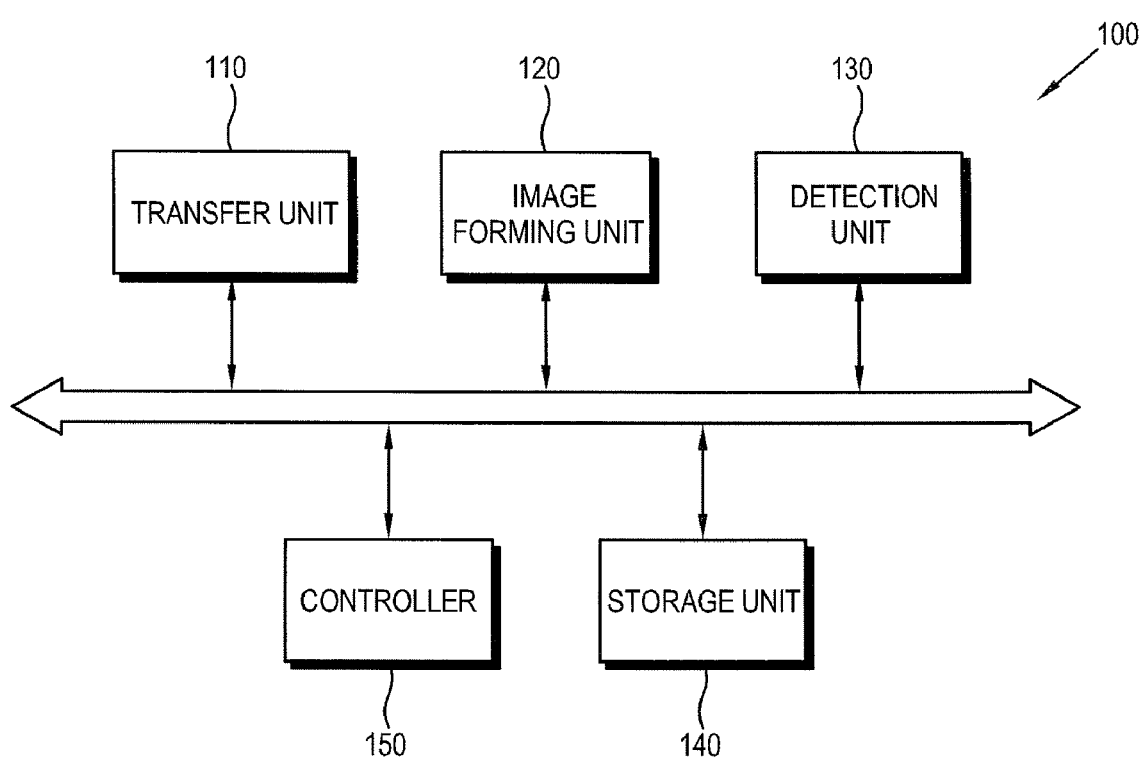

Referring to FIGS. 1 and 2, an image forming apparatus 100 according to an embodiment of the present general inventive concept may be provided as a laser printer, a facsimile, a multifunction device, or the like.

As illustrated in FIG. 1, the image forming apparatus 100 includes a transfer unit 110, an image forming unit 120, a detection unit 130 and a controller 150. As illustrated in FIG. 2, the image forming apparatus may further include a storage unit 140.

Figure 3:
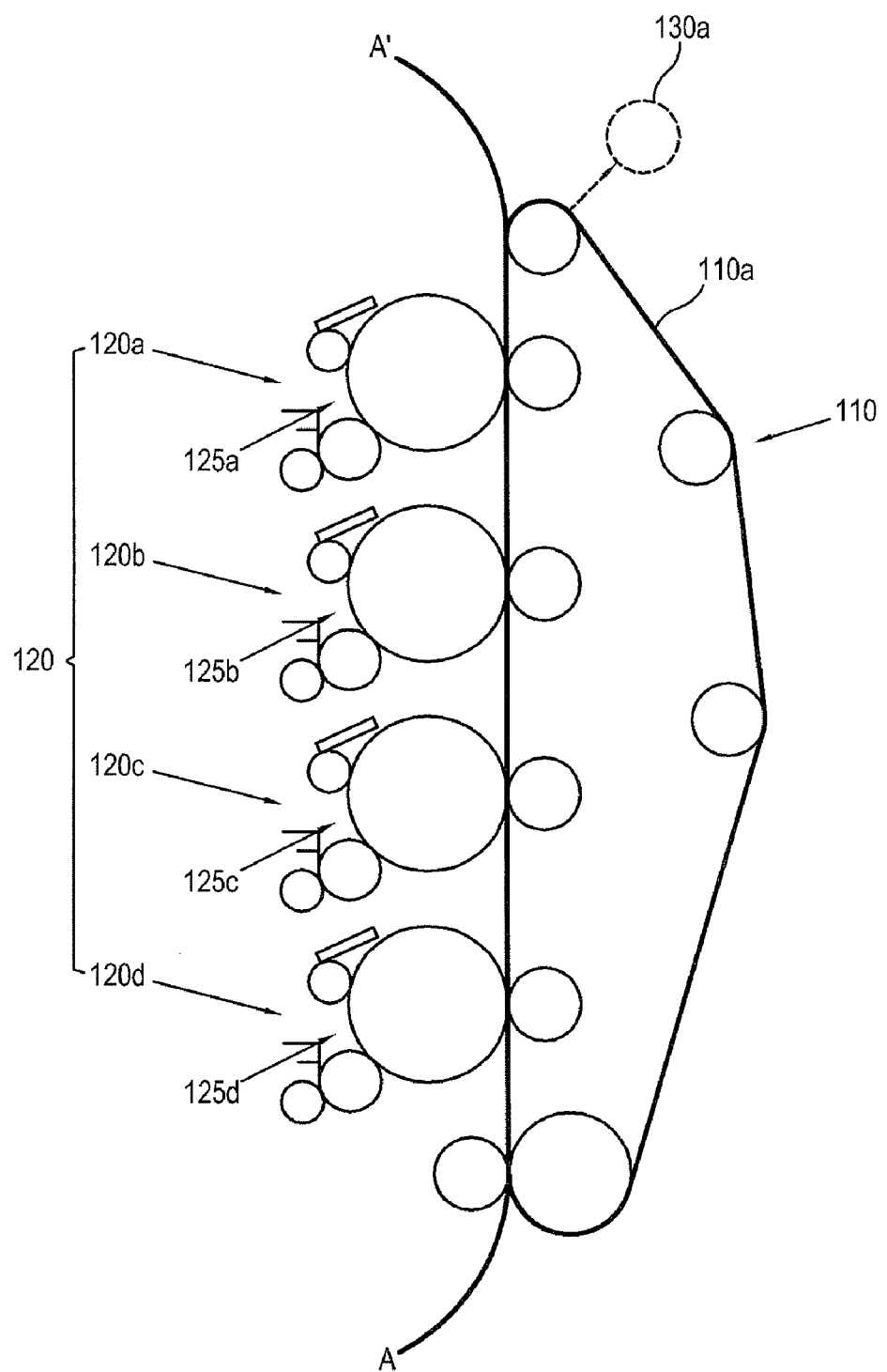
FIG. 3 is a section view illustrating a transfer unit of the image forming apparatus according to an embodiment of the present general inventive concept.

The transfer unit 110 can transfer an image developed by the image forming unit 120, for example to a printing medium on which an image is formed by the image forming unit 120, according to control of the controller 150. As illustrated in FIG. 3, the transfer unit 110 may include a transfer belt 110a to transfer the developed image or the image-formed printing medium.

For example, as illustrated in FIG. 3, a transfer belt 110a can move the printing medium through the image forming unit 120 along a moving path from a direction A to a direction A'.

Here, as the printing medium is moved through the image forming unit 120, the image forming unit 120 can perform exposure, development and transfer functions to transfer a developer to the printing medium according to printing data to form an image on the printing medium. As illustrated in FIG. 3, the image forming unit 120 may include a plurality of light exposing devices, for example, four light exposing devices 120a, 120b, 120c and 120d corresponding to four colors of cyan (C), magenta (M), yellow (Y) and black (K). The respective light exposing devices 120a, 120b, 120c, and 120d can emit light to form a plurality of detection marks on the transfer belt 110a corresponding to the colors C, M, Y and K according to printing data to perform the ACR. However, it is understood that other types of light emitting devices may be used to form the plurality of detection marks, and that the plurality of detection marks may be formed on other detectable areas or elements of the image forming apparatus other than the transfer belt to determine positions of the light exposing devices to perform the ACR function, without departing from the principles and spirit of the present general inventive concept.

Figure 4:
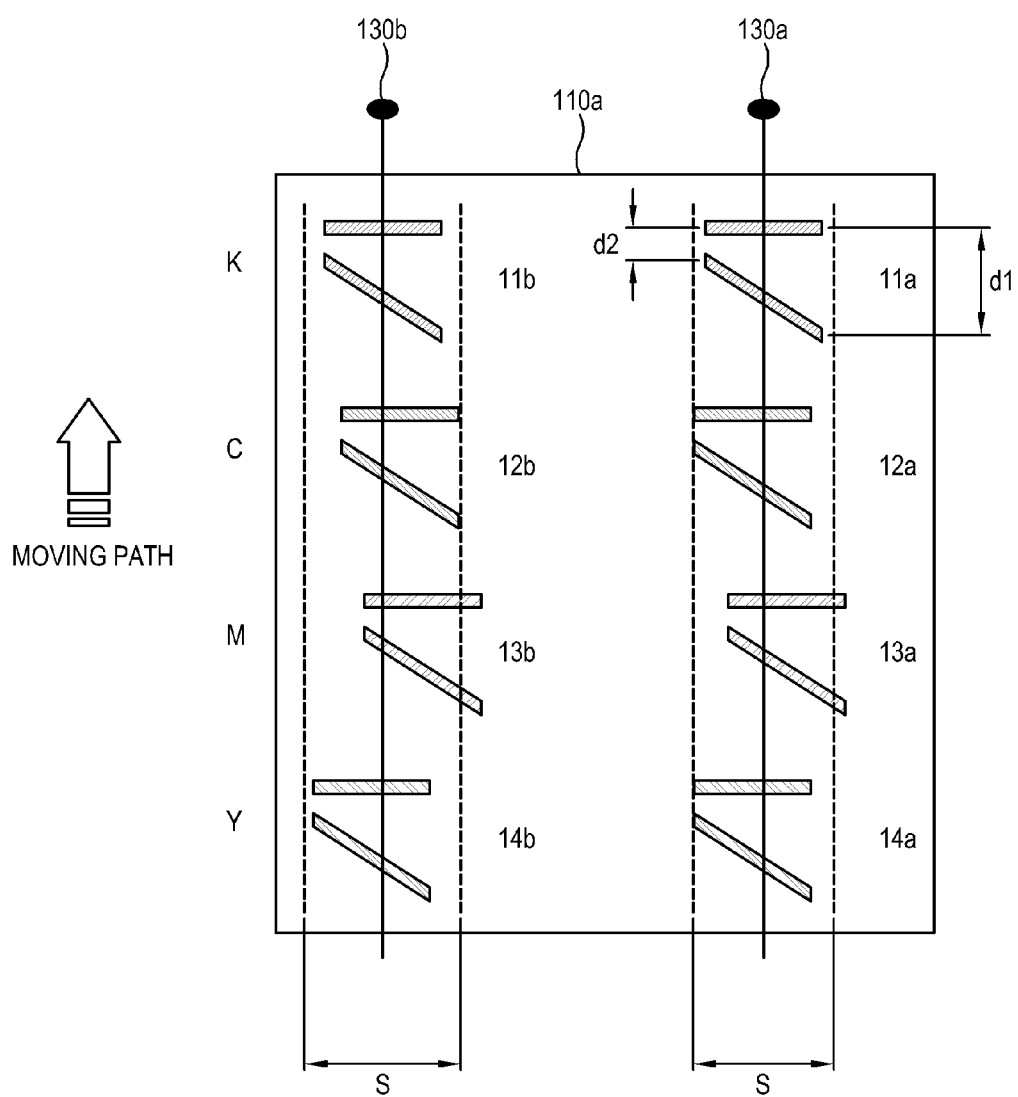
FIGS. 4 to 10 illustrate detection marks for use in the image forming apparatus according to an embodiment of the present general inventive concept.
Figure 5:
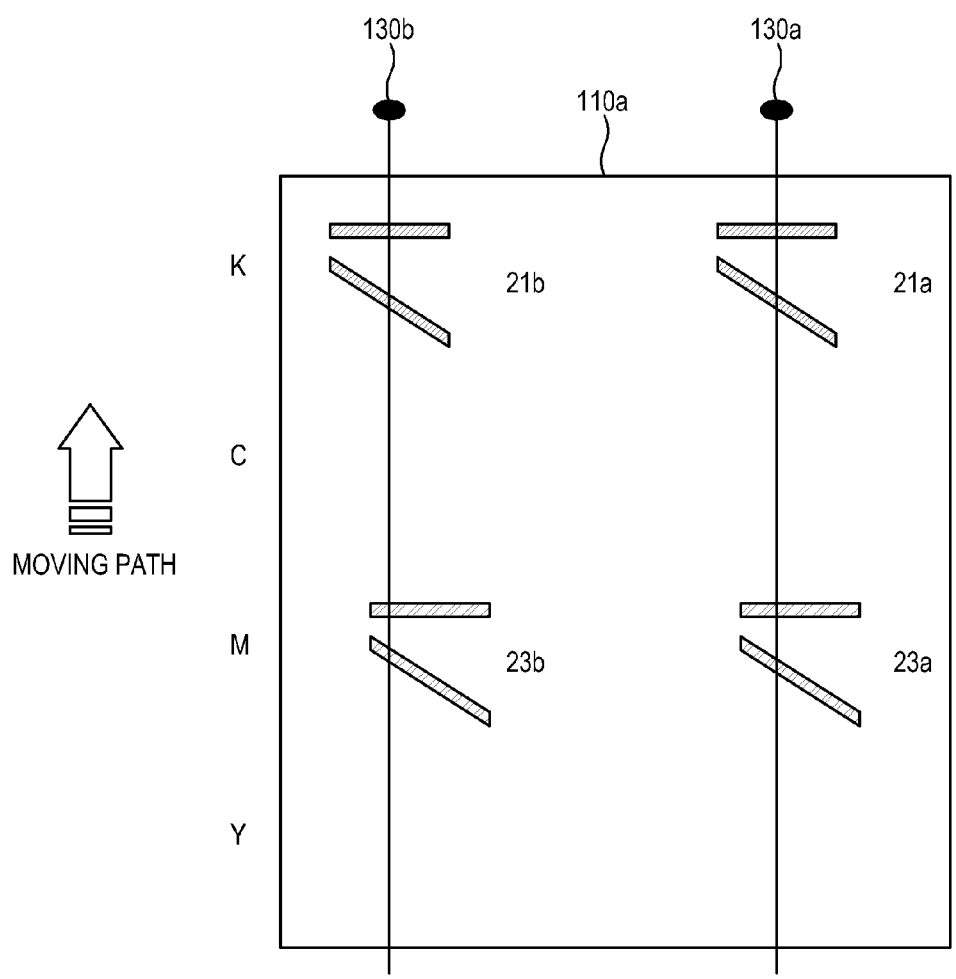

Referring to FIGS. 3-5, for example, the light exposing devices 120a, 120b, 120c, and 120d of the image forming unit 120 can emit light corresponding to four colors of cyan (C), magenta (M), yellow (Y), and black (K) to form a plurality of detection marks on the corresponding photosensitive bodies 125a, 125b, 125c, and 125d, respectively. The photosensitive bodies 125a, 125b, 125c, and 125d can be sequentially arranged along a moving path A to A' of the transfer belt 110a so as to transfer the detection marks formed on the photosensitive bodies to the transfer belt 110a. As illustrated in FIG. 4, a plurality of front detection marks 11a, 11b, 12a, 12b, 13a, 13b, 14a, and 14b may be formed for each of the four colors of C, M, Y, and K on the transfer belt 110a.

As described in more detail below, the detection unit 130 (FIG. 3) may include a light emitting part and a light receiving part to detect light reflected from the plurality of front detection marks 11a, 11b, 12a, 12b, 13a, 13b, 14a, and 14b to determine the positions of the front detection marks relative to a registration reference as illustrated by the vertical lines intersecting the respective detection marks. When the positions of the front detection marks are determined, the image forming unit 120 can then emit light to form one or more rear detection marks 21a, 21b, 23a, and 23b on the transfer belt 110a to correspond with at least one of the plurality of colors, except at least one of the other colors, based on the positions of the front detection marks 11a, 11b, 12a, 12b, 13a, 13b, 14a, and 14b. The detection unit 130 may then detect the positions of the rear detection marks 21a, 21b, 23a, and 23b to perform the ACR function.

For purposes of the present disclosure, the detection marks may be described in terms of their position on the transfer belt 110a as corresponding to the four colors C, M, Y and K of the image forming device. However, the present general inventive concept is not limited to these four colors, and may additionally correspond to four or more colors of the image forming unit 120. For example, the present general inventive concept may be applied to an image forming unit 120 having six, eight, nine, or more colors.

For example, in the case of six colors, six detection marks may be formed corresponding to the four colors C, M, Y and K and two intermediate colors of light cyan (Lc) and light magenta (Lm).

In the case of eight colors, eight detection marks may be formed corresponding to the six colors C, M, Y, K, Lc and Lm and two colors of green (Gr) and orange (O). In the case of nine colors, nine detection marks may be formed corresponding to the six colors C, M, Y, K, Lc and Lm and three colors of photo blue (B), light gray (Lg) and dark gray (G).

The detection marks may be formed to enable color registration by the image forming unit 120 according to control of the controller 150. The detection marks may be formed in a predetermined position of a surface of the transfer belt 110a on the basis of test data. The detection marks may be formed corresponding to the respective light exposing devices 120a, 120b, 120c and 120d. The detection marks may take the form of arbitrary symbols, characters, or the like, to reflect light signals to the detection unit 130. For example, as illustrated in FIG. 4, the detection marks may include two detection mark lines that are different in spaced distance at opposite ends thereof, as indicated by the reference numbers d1 and d2, respectively.

As illustrated in FIG. 3, the detection unit 130 may be provided on a traveling path of the transfer belt 110a to detect light reflected from the detection marks. As illustrated in FIG. 4, the detection unit 130 may be provided as an optical sensor 130a, 130b including a light emitting part and a light receiving part.

The detection marks can be configured to reflect light emitted from the light emitting part to the light receiving part. Accordingly, if light is reflected by the detection marks to the light receiving part, the detection unit 130 may generate detection results based on the received light, and may transmit the detection results to the controller 150 to perform the ACR.

The storage unit 140 can store the printing data and the test data therein to print the image and determine the positions of the detection marks. The image forming unit 120 can then read the printing data and the test data from the storage unit 140 to perform the printing and the color registration operations based on the printing data and the test data.

The controller 150 can perform control operations of the image forming apparatus 100. In particular, the controller 150 can control the image forming unit 120 to form an image on a printing medium based on the printing data and to form the detection marks on the transfer belt 110a based on the test data.

For example, if a predetermined ACR requirement such as replacement of a developing unit, opening/closing of a cover, or printing of predetermined sheets of printing mediums is satisfied, the controller 150 can control the image forming unit 120 to form the detection marks having a predetermined pattern on the transfer belt 110a, so as to perform the ACR.

FIGS. 4 to 10 illustrate detection marks configured in accordance with an embodiment of the present general inventive concept.

Referring to FIG. 4, the controller 150 can control the image forming unit 120 to form at least one set of front detection marks 11a to 14a and 11b to 14b.

In response to light reflected from these front detection marks, the controller 150 can receive detection results corresponding to the front detection marks from the detection unit 130, and then can determine whether or not there exists any color of which the front detection marks are positioned beyond a first predetermined error range, as illustrated by the letter S of FIG. 4.

Here, a color registration reference (to be described later) may be used as a reference to determine whether the front detection marks 11a to 14a and 11b to 14b are positioned beyond the first error range S.

Also, the first error range may represent an allowable position range which is preset to determine whether a certain detection mark is positioned within a normal position. For example, the first error range may be set to 5 dots.

For example, referring to FIG. 4, the front detection marks 13a and 13b (corresponding to the color M) may be determined to be excessively shifted beyond the first error range S, according to detection results of the detection unit 130, since the detection marks 13a and 13b extend beyond the error range S.

Figure 6:
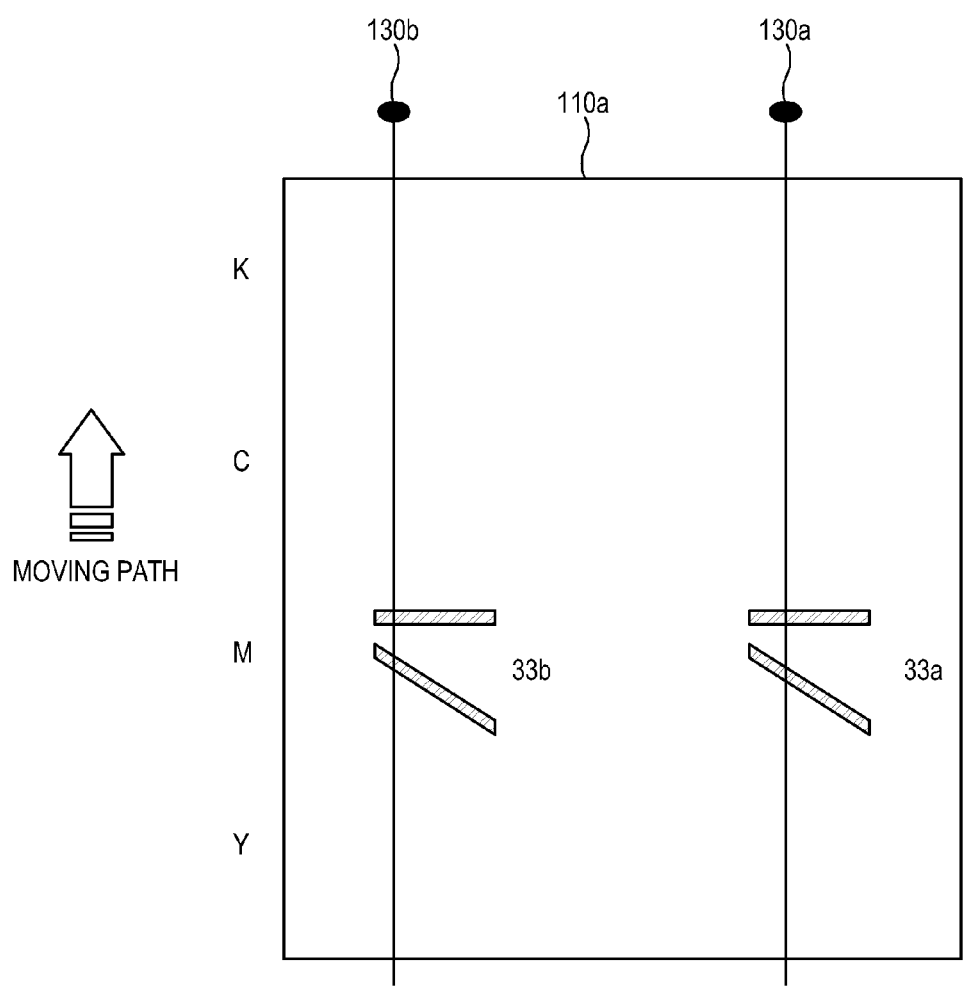

Referring to FIGS. 5 and 6, the controller 150 may control the image forming unit 120 to form predetermined N sets of first rear detection marks 23a and 23b, and 33a and 33b corresponding to any color of which the front detection marks are determined to be beyond the first error range according to the detection results of the detection unit 130, so as to perform the ACR. The first rear detection marks can thus be formed to at least one of the colors, except at least one of the other colors, among the plurality of colors to perform the ACR.

Here, it is noted that a predetermined color registration reference may be used while the first rear detection marks 23a, 23b, 33a and 33b are formed.

The color registration reference may be one color previously set among the plurality of colors. Referring to FIG. 5, N sets of the first rear detection marks 21a and 21b are formed to the color K; and N sets of the first rear detection marks 23a and 23b are formed to the color M of which the front detection marks are beyond the first error range S (FIG. 4) as compared with the color K. The controller 150 performs the ACR for the color M on the basis of the positions of the rear detection marks 21a and 21b corresponding to the color K.

In FIG. 5, for example, the color K is used as the color registration reference. The controller 150 forms the first rear detection marks 21a and 21b corresponding to the color K used for the color registration reference and the color M of which the front detection marks are beyond the first error range. Accordingly, since rear detection marks are not formed with respect to colors C and Y, consumption of a developer can be minimized while performing the ACR since the first rear detection mark is not formed with respect to at least one of the plural colors.

Alternatively, the controller 150 may perform the ACR for the color M on the basis of the position of the detection unit 130, as illustrated in FIG. 6.

In FIG. 6, the position of the detection unit 130 can be employed as the color registration reference. The controller 150 thus forms first rear detection marks 31a and 31b corresponding to only the color M of which the front detection marks are beyond the first error range S (FIG. 4) with respect to the position of the detection unit 130. Accordingly, consumption of a developer can be minimized while performing the ACR since the first rear detection mark is not formed to at least one of the plural colors.

Meanwhile, the color registration reference may be one of two or more colors, of which a registration deviation between two or more corresponding front detection marks is within the first error range, among the plurality of colors.

Figure 7:
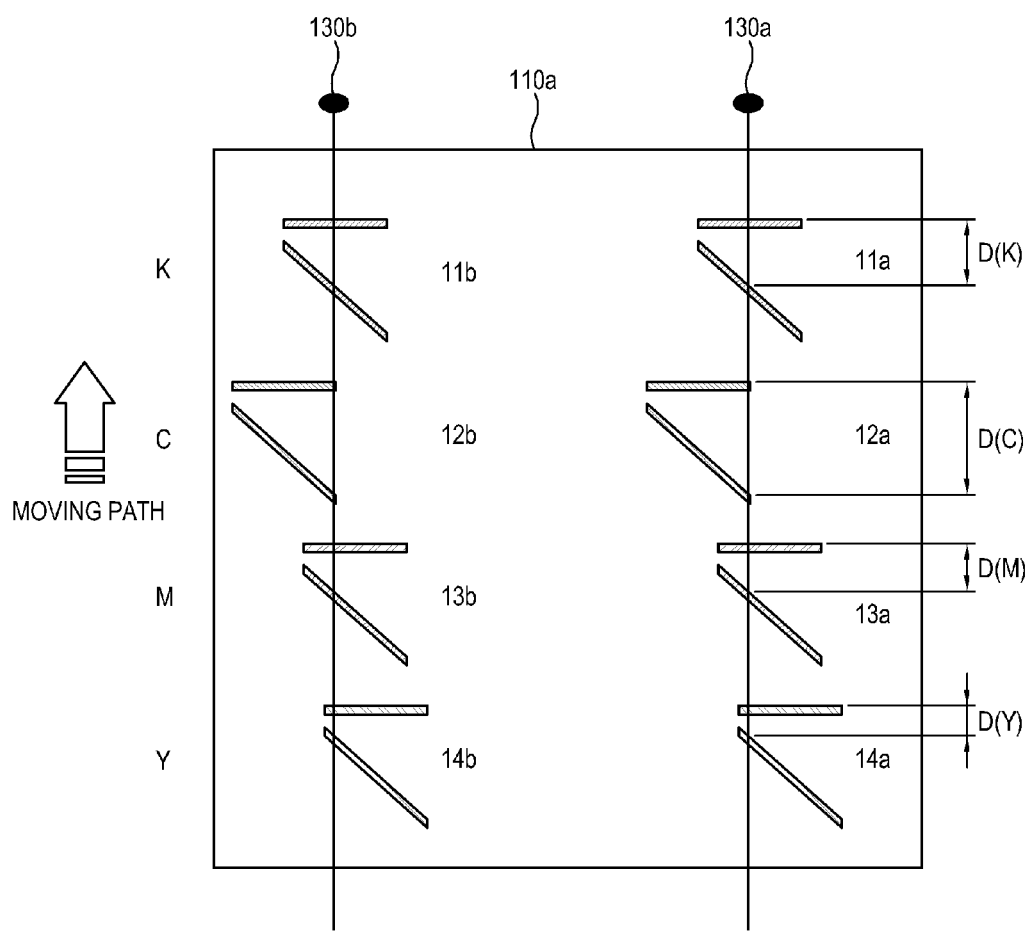

As illustrated in FIG. 7, the controller 150 may determine the number of colors of which the registration deviation between the plural front detection marks corresponding to the plural colors is within the first error range.

Here, the controller 150 can compare and extrapolate the first error range S with the distance D for each color between two detection mark lines included in the front detection mark, thereby determining the number of colors of which the registration deviation between the plural front detection marks is within the first error range.

For example, the controller 150 can use the following equations to determine the number of colors of which the registration deviation is within the first error range among the front detection marks 12a, 12b, 13a, 13b, 14a and 14b of the colors C, M, and Y with respect to the front detection marks 11a and 11b of the color K.

if $|D(K)-D(C)|>TD(K)=TD(K)+1$ if $|D(K)-D(M)|>TD(K)=TD(K)+1$ if $|D(K)-D(Y)|>TD(K)=TD(K)+1$

Here, the TD(K) has an initial value of '0.'

For example, referring to FIG. 7, a difference between the distance D(K) between the detection mark lines of the color K and the distance D(C) between the detection mark lines of the color C is larger than the first error range S, so that the TD(K) becomes '1.' On the other hand, a difference between the distance D(K) between the detection mark lines of the color K and the distance D(M) between the detection mark lines of the color M is smaller than the first error range S, so that the TD(K) maintains '1.' Further, a difference between the distance D(K) between the detection mark lines of the color K and the distance D(Y) between the detection mark lines of the color C is larger than the first error range S, so that the TD(K) becomes '2.'

Accordingly, in this example, the final TD(K) becomes '2.'

Then, the controller 150 can sequentially use the following equations in the same manner to determine TD for each color. That is, the controller 150 can calculate TD(C) by determining the number of colors of which the registration deviation is within the first error range among the front detection marks 11a, 11b, 13a, 13b, 14a, 14b of the colors K, M, and Y with respect to the front detection marks 12a and 12b of the color C; can calculate TD(M) by determining the number of colors of which the registration deviation is within the first error range among the front detection marks 11a, 11b, 12a, 12b, 14a, 14b of the colors K, C, and Y with respect to the front detection marks 13a and 13b of the color M; and can calculate TD(Y) by determining the number of colors of which the registration deviation is within the first error range among the front detection marks 11a, 11b, 12a, 12b, 13a, 13b of the colors K, C, and M with respect to the front detection marks 14a and 14b of the color Y.

if $|D(C)-D(K)|>TD(C)=TD(C)+1$ if $|D(C)-D(M)|>TD(C)=TD(C)+1$ if $|D(C)-D(Y)|>TD(C)=TD(C)+1$ if $|D(M)-D(K)|>TD(M)=TD(M)+1$ if $|D(M)-D(C)|>TD(M)=TD(M)+1$ if $|D(M)-D(Y)|>TD(M)=TD(M)+1$ if $|D(Y)-D(K)|>TD(Y)=TD(Y)+1$ if $|D(Y)-D(C)|>TD(Y)=TD(Y)+1$ if $|D(Y)-D(M)|>TD(Y)=TD(Y)+1$

Referring to FIG. 7, the distance difference of the color C between the detection mark lines is larger than the first error range S with respect to all colors K, M and Y, so that the TD(C) becomes '3.'

The distance difference of the color M between the detection mark lines is larger than the first error range S with respect to only the color C, so that the TD(M) becomes '1.'

The distance difference of the color Y between the detection mark lines is larger than the first error range S with respect to only the colors K and C, so that the TD(Y) becomes '2.'

Accordingly, in FIG. 7, the color having the most other colors of which the registration deviation between the plural front detection marks corresponding to the plural colors is within the first error range is the color M having the lowest TD(color) value.

Figure 8:
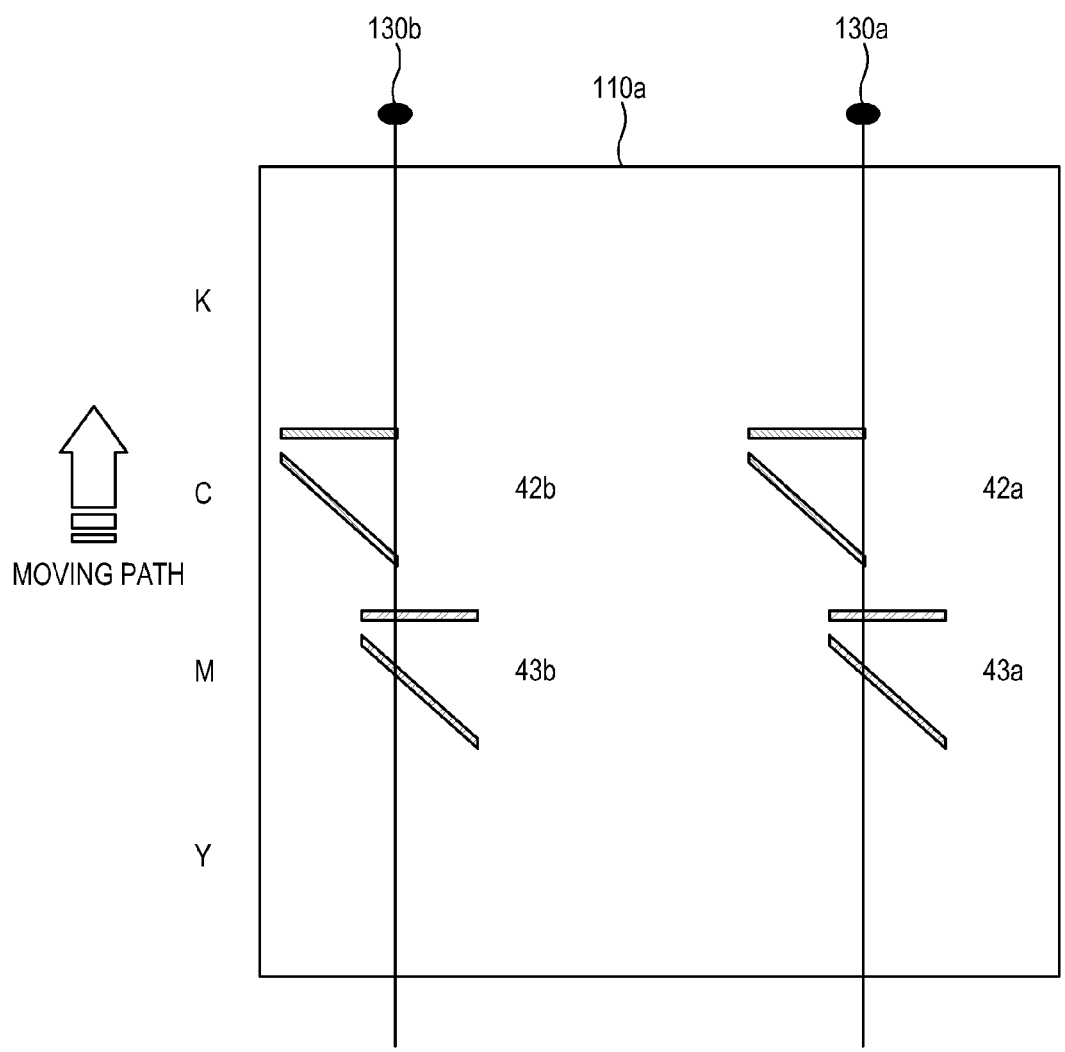

Thus, the controller 150 may select the color M for the color registration reference as illustrated in FIG. 8, and may form the first rear detection marks 43a and 43b of the color M for the color registration reference, and the first rear detection marks 42a and 42b of the color C for the color beyond the first error range, thereby performing the ACR with decreased consumption of developer since the first rear detection marks are not formed with respect to at least one of the plural colors.

Occasionally, there may be a plurality of colors having the most other colors of which the registration deviation between the plural front detection marks corresponding to the plural colors is within the first error range.

Figure 9:
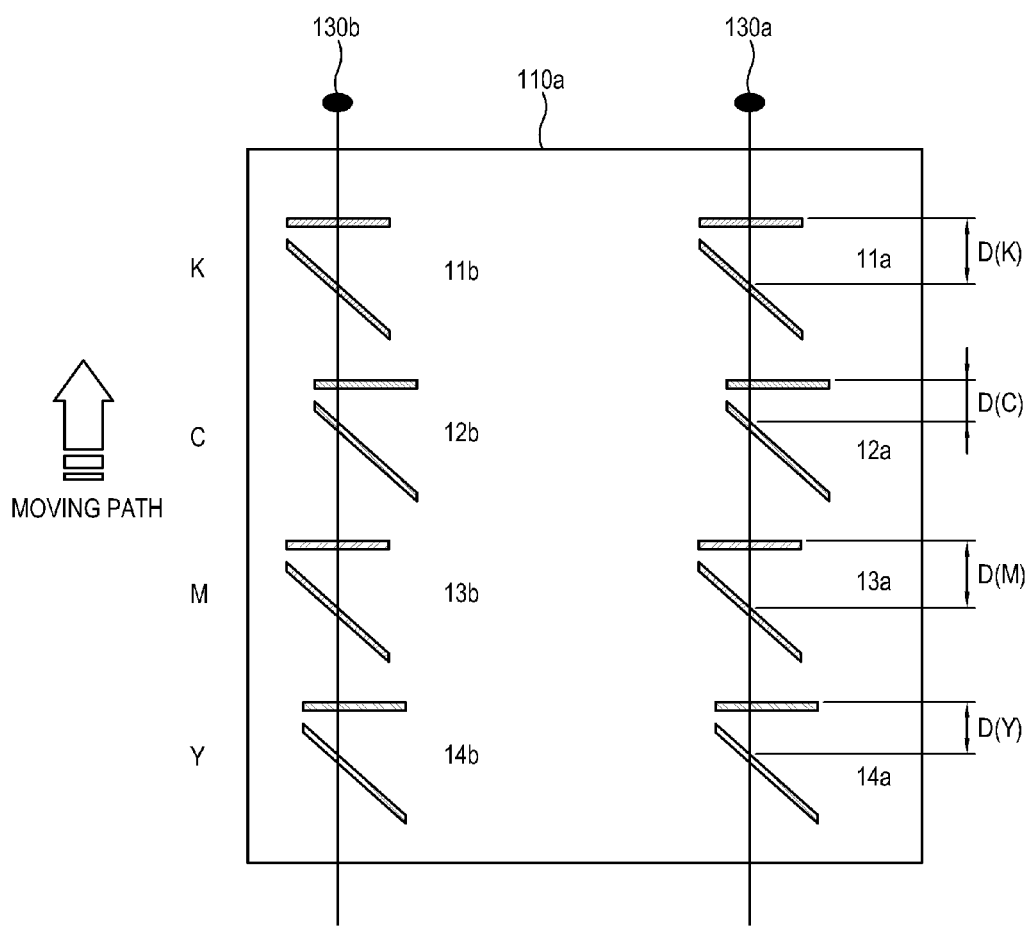

For example, as illustrated in FIG. 9, the color K of which the distance difference between the detection mark lines is larger than the first error range S with respect to the colors C and Y, so that the TD(K) becomes '2.' Further, the color C of which the distance difference between the detection mark lines is larger than the first error range S with respect to all colors K, M and Y so that the TD(K) becomes '3.' Also, the color Y of which the distance difference between the detection mark lines is larger than the first error range S with respect to all colors K, C and M, so that the TD(Y) becomes '3.'

Thus, the controller 150 may select one of two colors having the lowest TD(color) value for the color registration reference, i.e., may select between two colors K and M each having the most other colors of which the registration deviation between the plural front detection marks is within the first error range.

Here, the controller 150 may select one color for the color registration reference on the basis of the registration deviation SD(color) previously obtained corresponding to each color among two or more colors each having the most other colors of which the registration deviation between the front detection marks is within the first error range.

More specifically, the previously obtained registration deviation SD(color) may be a statistical deviation based on the ACR previously performed according to the plural colors.

For example, the controller 150 may use the following equations to calculate the registration deviation based on previous K data. Here, the number of data, i.e., K is varied depending on the mechanical properties of the image forming apparatus 100.

Figure 10:
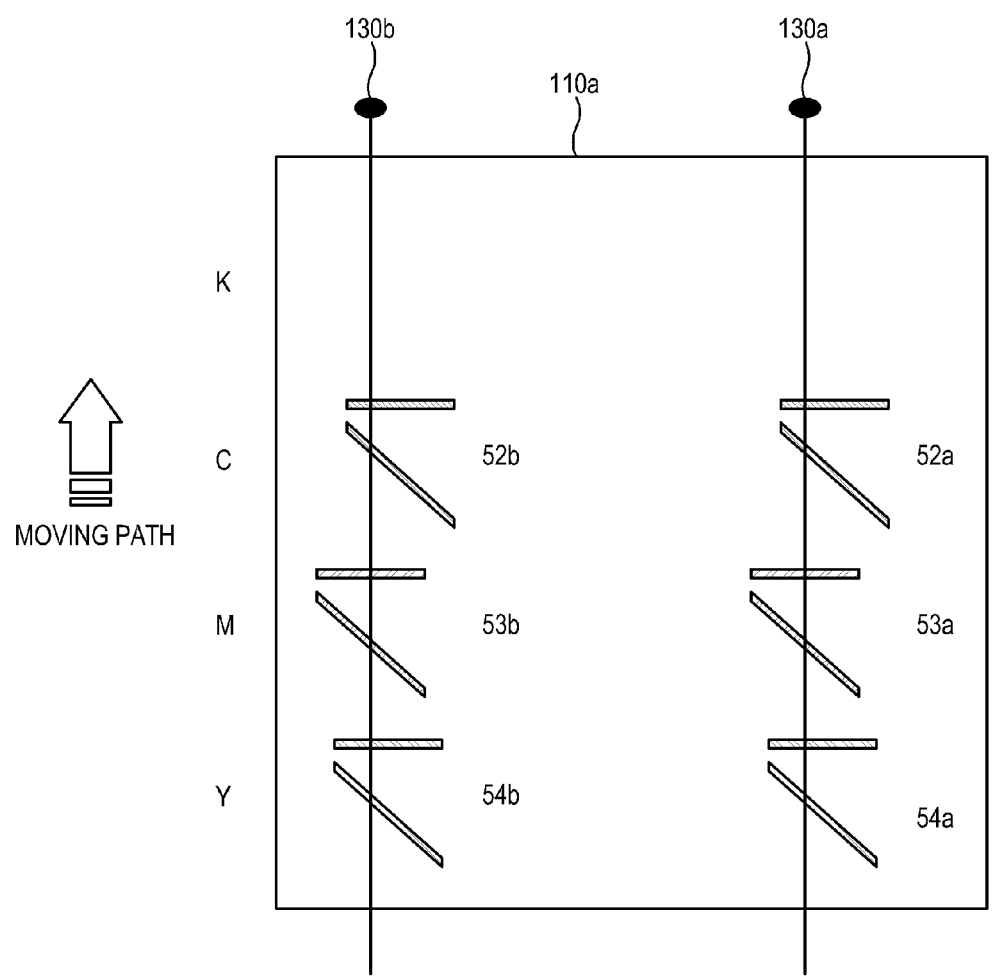
Figure 11:
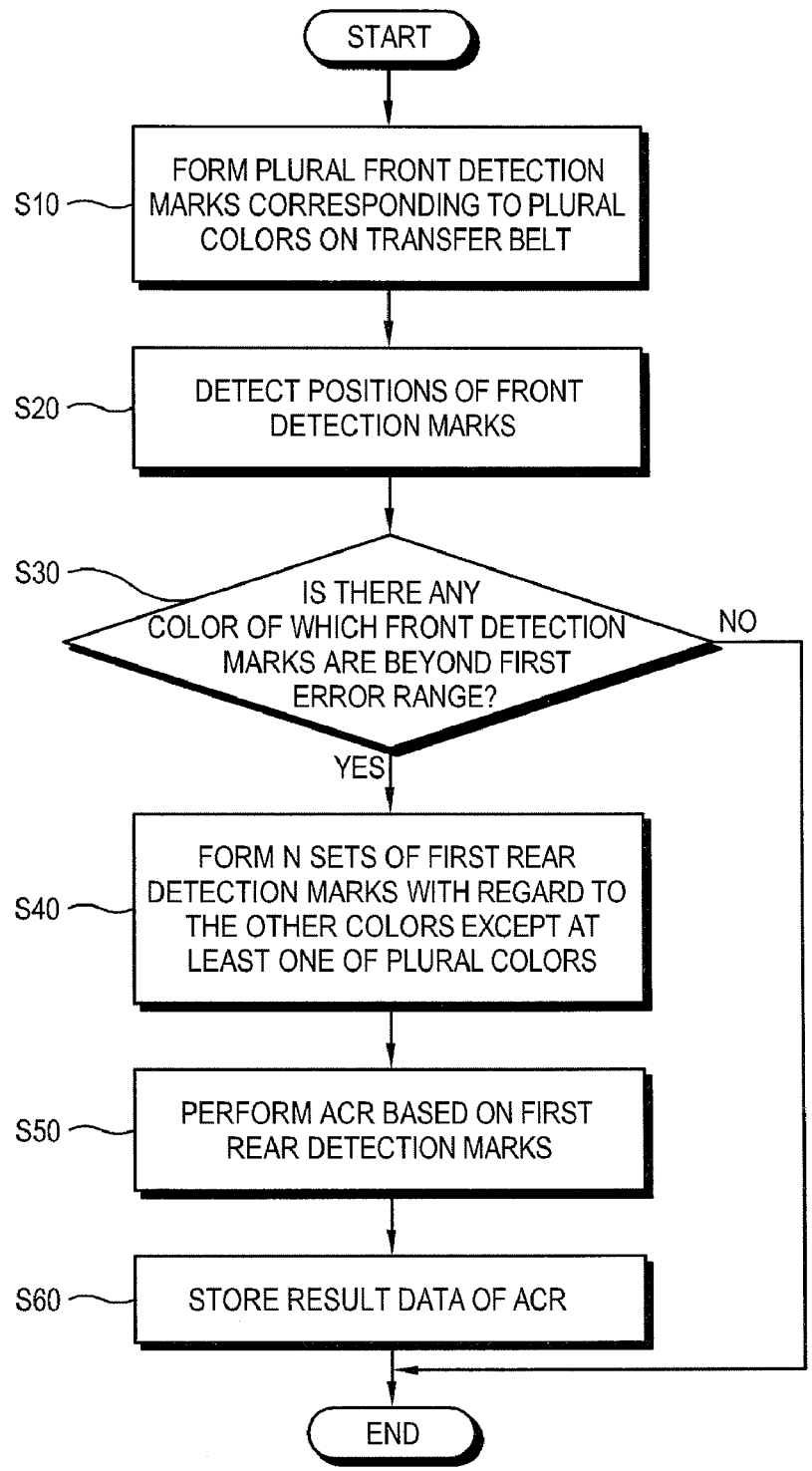
FIGS. 11, 12, 13A and 13B are flowcharts illustrating a color registration method of the image forming apparatus according to an embodiment of the present general inventive concept.

$N=(D1+D2+\ldots,+DK)/K$, for $D1, D2, \ldots, DK$ $D(K)=(N-DK)2$ $SD=\text{SquareRoot}((D(1)+D(2)+\ldots+D(K))/K)$ Accordingly, in FIG. 9, two colors having the lowest TD(color) values (i.e., the colors K and M) can be compared to each other with respect to the SD(color). Here, if the SD(M) is smaller than the SD(K), the controller 150 may select the color M for the color registration reference as illustrated in FIG. 10, and may form the first rear detection marks 53a and 53b of the color M for the color registration reference, and may form the first rear detection marks 52a and 52b of the color C which is beyond the first error range, and rear detection marks 54a and 54b of the color Y, thereby performing the ACR.

In the meantime, the controller 150 may determine whether or not there exists any color of which the front detection marks are beyond a predetermined second error range (not illustrated) among the colors of which the front detection marks are beyond the first error range S, and may form a second rear detection mark to be spaced at a predetermined position from the front detection mark of the color of which the front detection mark is beyond the second error range.

Here, the positions of the front detection marks which are beyond the second error range are not detected by the detection unit 130 or are excessively beyond the color registration reference as illustrated by, for example, the positions of the rear detection marks of the color K or the position of the detection unit 130. The second error range may be larger than the first error range. For example, the second error range may be approximately 10 dots.

Specifically, if the front detection marks 13a and 13b corresponding to the color M are excessively shifted out of the color registration reference, beyond the first error range, according to the detection results of the detection unit 130 (refer to FIG. 4), the controller may further determine whether the front detection marks 13a and 13b of the color M are excessively shifted out of the reference position beyond the second error range.

If it is determined that the front detection marks 13a and 13b of the color M are excessively shifted out of the color registration reference beyond the second error range, the controller 150 may control the image forming unit 120 to form predetermined K sets of second rear detection marks to be roughly spaced by the predetermined position from the rear detection marks 23a and 23b, or 33a and 33b of the color M (refer to FIG. 5 or FIG. 6).

Accordingly, the second rear detection marks can be positioned within the second error range.

The controller 150 can control the image forming unit 120 to form predetermined N sets of the first rear detection marks with regard to the colors of which the registration deviation between the second rear detection mark within the second error range and the color registration reference is beyond the first error range, can control the detection unit 130 to detect the positions of N sets of the first rear detection marks, and can perform the ACR so that the rear detection marks can be positioned within the first error range.

Here, the number K may be smaller than the number N.

As described above, the image forming apparatus 100 can form the front detection mark, and can perform the ACR while forming the first rear detection mark excluding at least one color, thereby minimizing consumption of a developer.

Also, the number of first rear detection marks to be formed can be decreased with priority about the color registration reference, thereby further minimizing consumption of a developer.

Further, the image forming apparatus 100 can perform the ACR for the color of which the detection marks are formed in positions which are difficult or impossible to detect.

Hereinafter, a color registration process in the above-configured image forming apparatus 100 will be described with reference to FIGS. 11, 12, 13A and 13B.

Firstly, in operation S10, the controller 150 can control the image forming unit 120 to transfer a developer to a surface of the transfer belt 110a and to form at least one set of the plurality of front detection marks corresponding to the plurality of colors of the image forming unit 120. Here, the plurality of front detection marks may correspond to the colors C, M, Y and K, or alternatively, may correspond to four or more colors according to colors of the image forming unit 120.

Next, in operation S20, the detection unit 130 can detect the positions of the front detection marks.

In operation S30, the controller 150 can determine whether or not there exists any color of which the front detection marks are beyond the first error range according to the detection results.

Here, the reference for determining whether the front detection marks 11a through 14a and 11b through 14b are beyond the first error range may be the color registration reference, and the first error range may be 5 dots.

More specifically, the color registration reference, which is selectable at the operation S30, may be the color registration reference previously set among the plurality of colors, and may be one of two or more colors of which the registration deviations between two or more front detection marks corresponding to the plural colors are within the first error range, and the positions of the detection unit 130.

Figure 12:
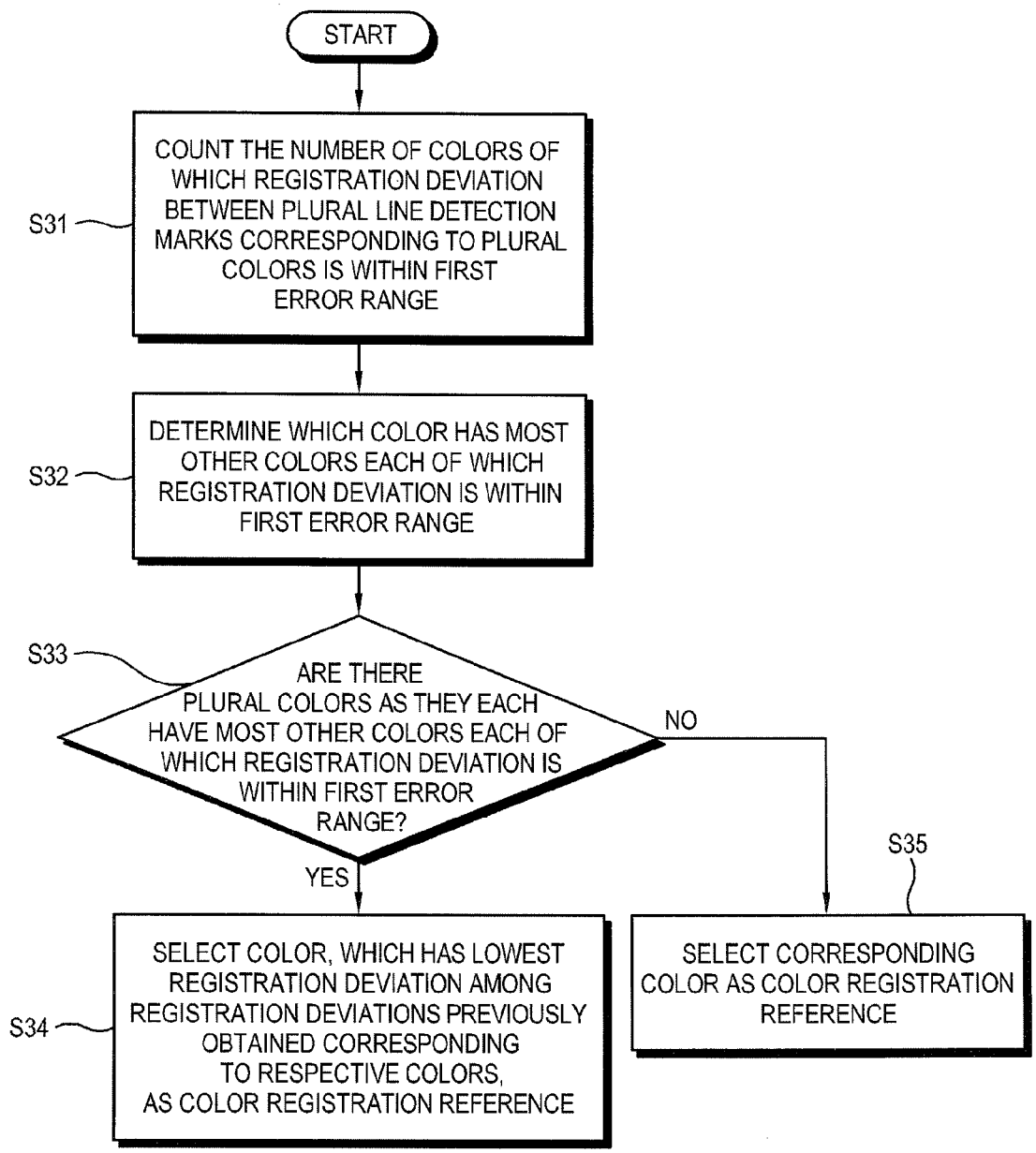

If the color registration reference is selected at the stage S30 as one color between two or more colors of which the registration deviations between two or more front detection marks corresponding to the plural colors are within the first error range, the controller 150 may count the number of colors of which the registration deviation between the plural front detection marks corresponding to the plural colors is within the first error range as illustrated in FIG. 12 (operation S31).

Based on the result from operation S31, the controller 150 can determine, in operation S32, which color has the most other colors of which the registration deviation is within the first error range.

Further, in operation S33, the controller 150 can determine whether there exist plural colors determined at the stage S32 that have the most other colors each of which the registration deviation is within the first error range.

In operation S34, if it is determined at operation S33 that there exist plural colors having the most other colors of which the registration deviation is within the first error range, the controller 150 may select a color having the lowest registration deviation among the registration deviations previously obtained corresponding to the respective colors, as the color registration reference.

On the other hand, in operation S35, if it is determined at stage S33 that there exists only one color having the most other colors each of which the registration deviation is within the first error range, the controller 150 can select the one color as the color registration.

In operation S40, if it is determined that there exists any color of which the front detection marks are beyond the first error range, the controller 150 can control the image forming unit 120 to form predetermined N sets of first rear detection marks corresponding to the other colors excluding at least one color among the plural colors through the color registration reference.

In operation S50, the controller 150 can perform the ACR on the basis of the first rear detection marks formed at the stage S40.

Further, in operation S60, the controller 150 can control result data of the ACR performed at the stage S50 to be stored in the storage unit 140.

Here, the result data may include the registration deviation about the ACR, and the controller 150 may update the result data with the registration deviation about the ACR.

Figure 13A:
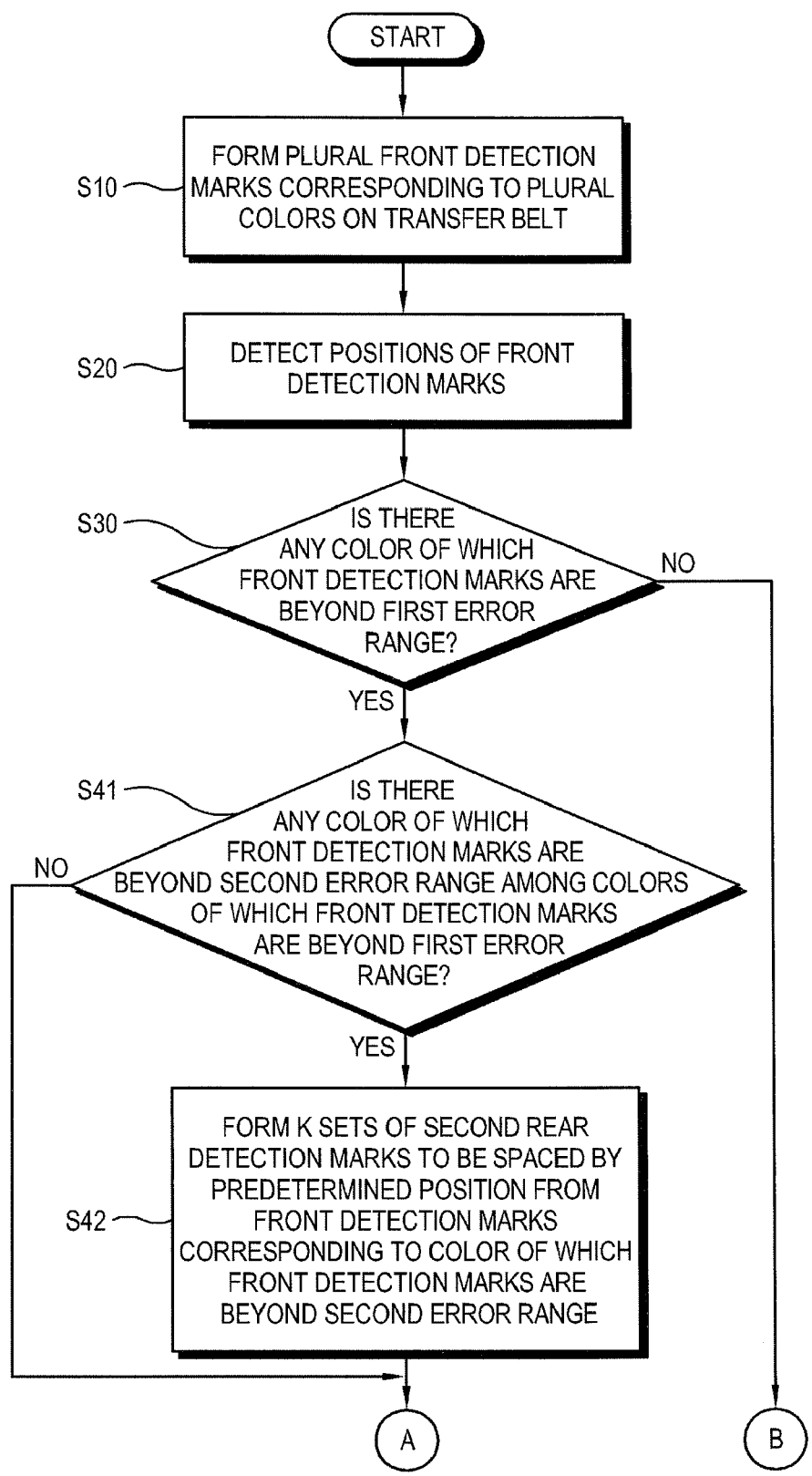
Figure 13B:
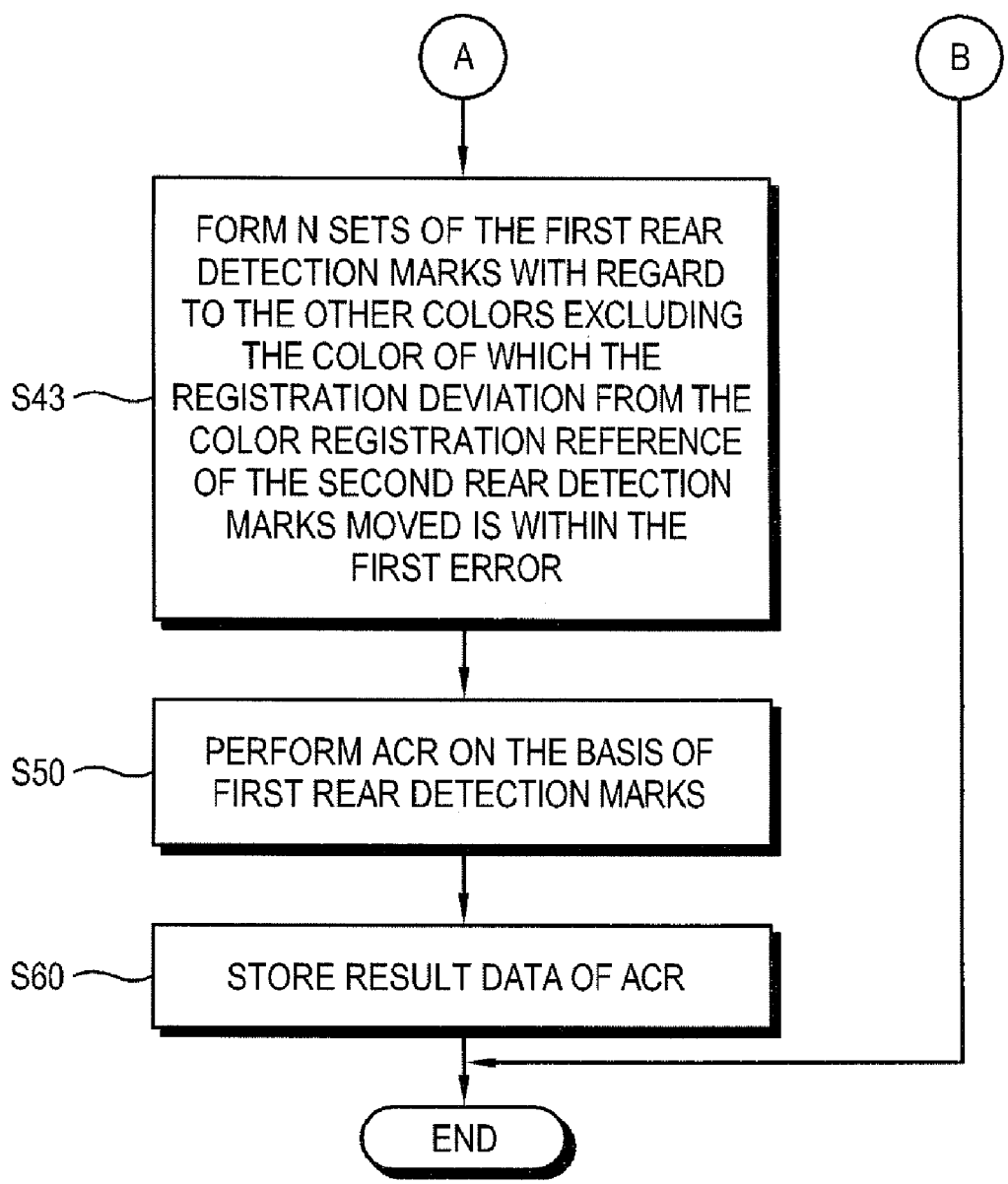

Referring to FIGS. 13A and 13B, in operation S41, the controller 150 may determine whether or not there exists any color of which the front detection marks are beyond the second error range among the colors of which the front detection marks are beyond the first error range, before operation S40 is performed.

In operation S42, if it is determined at operation S41 that there exists any color of which the front detection marks are beyond the second error range, the controller 150 may control the image forming unit 120 to form predetermined K sets of second rear detection marks while roughly moving by a predetermined position from the front detection marks corresponding to the color of which the front detection marks are beyond the second error range. Here, the positions of the first detection marks which are beyond the second error range may be difficult or impossible to detect by the detection unit 130, or may be excessively shifted out of the reference position. The second error range can be larger than the first error range. For example, the second error range may be 10 dots.

The number K may be smaller than the number N.

In operation S43, the controller 150 may form predetermined N sets of the first rear detection marks with regard to the other colors excluding the color of which the registration deviation from the color registration reference of the second rear detection marks moved at the stage S42 is within the first error range.

Then, in operation S50, the controller 150 may perform the ACR on the basis of the first rear detection marks.

Further, in operation S60, the controller 150 can control result data of the ACR performed at the stage S50 to be stored in the storage unit 140.

As described above, the image forming apparatus and the color registration method thereof according to the present general inventive concept can perform the ACR for the other color except at least one color among a plurality of colors, to decrease developer consumption, and accordingly, decrease costs for new developer purchase and waste developer disposal. Additional problems such as developer scattering, and life shortening of the apparatus and environmental contamination can also be decreased.

Further, the image forming apparatus and the color registration method thereof can perform the ACR even for a color which is excessively shifted out of position and difficult or impossible to detect.

Although a few embodiments of the present general inventive concept have been illustrated and described, it will be appreciated by those skilled in the art that changes may be made in these embodiments without departing from the principles and spirit of the present general inventive concept, the scope of which is defined in the appended claims and their equivalents.

What is claimed is:

1. A color registration method of an image forming apparatus, the method comprising:
    forming a plurality of front detection marks corresponding to a plurality of colors on a transfer belt;
    forming a first rear detection mark corresponding to at least one of the colors, except at least one of the other colors, using a color registration reference; and
    performing auto color registration (ACR) on the basis of the first rear detection mark.

2. The method of claim 1, wherein the color registration reference comprises one color previously set among the plurality of colors.

3. The method of claim 1, wherein the color registration reference comprises one color of which registration deviations between two or more front detection marks among the plurality of colors are within a first error range.

4. The method of claim 3, further comprising:
    determining the number of colors of which the registration deviation between a front detection mark of each of the plurality of colors and front detection marks of the other colors is within the first error range,
    wherein a color having the most number of colors of which the registration deviation is within the first error range is selected as the color registration reference based on the determination result.

5. The method of claim 3, further comprising:
    selecting at least one color as the registration reference for the ACR among the two or more colors based on the registration deviation previously obtained corresponding to each color.

6. The method of claim 3, further comprising:
    determining whether there exists any color among the plurality of colors of which the registration deviation between the plurality of front detection marks is beyond a second error range larger than the first error range; and
    forming a second rear detection mark to be spaced by a predetermined difference from the front detection mark of the color of which the registration deviation is beyond the second error range,
    wherein the forming the first rear detection mark comprises forming the first rear detection mark with regard to the other colors except the color of which the registration deviation between the second rear detection marks is within the first error range.

7. The method of claim 1, wherein each front detection mark comprises two detection mark lines that are different in spaced distance at opposite ends thereof.

8. The method of claim 7, further comprising:
    determining whether there exists any color among the plurality of colors of which the registration deviation between positions of a detection unit and the plurality of front detection marks is beyond a second error range larger than a first error range; and
    forming a second rear detection mark to be spaced at a predetermined position from the front detection mark of the color of which the registration deviation is beyond the second error range,
    wherein the forming the first rear detection mark comprises forming the first rear detection mark with regard to the other colors except the color of which the registration deviation between the second rear detection mark is within the first error range.

9. The method of claim 1, wherein the color registration reference comprises positions of a detection unit that detects the front detection marks.

10. The method of claim 1, wherein the plurality of front detection marks are formed corresponding to at least four colors.

11. The method of claim 1, wherein at least one set of the plural front detection marks is formed.

12. The method of claim 1, further comprising:
    storing result data of the ACR.

13. The method of claim 12, wherein the result data comprises a registration deviation based on the ACR, and
    the storing the result data comprises updating the result data with the registration deviation based on the ACR.

14. An image forming apparatus, comprising:
    a transfer unit comprising a transfer belt;
    an image forming unit to form a plurality of detection marks corresponding to a plurality of colors on the transfer belt;
    a detection unit to detect positions of the detection marks; and a controller to form a plurality of front detection marks corresponding to a plurality of colors on the transfer belt, to form a first rear detection mark corresponding to at least one of the colors, except at least one of the other colors, using a color registration reference based on detection results of the detection unit, and to perform auto color registration (ACR) on the basis of the first rear detection mark.

15. The image forming apparatus of claim 14, wherein the color registration reference comprises one color previously set among the plurality of colors.

16. The image forming apparatus of claim 14, wherein the color registration reference comprises one color of which registration deviations between two or more front detection marks among the plurality of colors are within a first error range.

17. The image forming apparatus of claim 16, wherein the controller determines the number of colors of which the registration deviation between a front detection mark of each of the plurality of colors and front detection marks of the other colors is within the first error range, and selects a color having the most number of colors of which the registration deviation is within the first error range as the color registration reference based on the determination result.

18. The image forming apparatus of claim 16, wherein the controller selects at least one color as the registration reference of the ACR among the two or more colors, based on the registration deviation previously obtained corresponding to each color.

19. The image forming apparatus of claim 16, wherein the controller determines whether there exists any color among the plurality of colors of which the registration deviation between the plurality of front detection marks is beyond a second error range larger than the first error range, forms a second rear detection mark to be spaced by a predetermined difference from the front detection mark of the color of which the registration deviation is beyond the second error range, and forms the first rear detection mark with regard to the other colors except the color of which the registration deviation between the second rear detection mark is within the first error range.

20. The image forming apparatus of claim 14, wherein each front detection mark comprises two detection mark lines that are different in spaced distance at opposite ends thereof.

21. The image forming apparatus of claim 14, wherein the color registration reference comprises positions of a detection unit that detects the front detection marks.

22. The image forming apparatus of claim 14, further comprising a storage unit to store result data of the ACR.

23. The image forming apparatus of claim 14, wherein the detection unit comprises an optical sensor which comprises a light emitting part and a light receiving part.

24. An image forming apparatus, comprising:
a light exposing unit to form front and rear detection marks corresponding to starting and ending positions of a plurality of colors, respectively;
a detection unit to detect positions of the front and rear detection marks; and
a controller to determine whether there exists any color of which the front detection marks are positioned beyond a first error range, and if so:
the controller controls the light exposing unit to form a rear detection mark only with respect to the any color, and adjusts the starting and/or ending positions of the any color based on the position of the rear detection mark relative to a color registration reference.

25. The image forming apparatus of claim 24, wherein the controller calculates a registration deviation among the plurality of colors based on the position of the front detection marks, determines the number of colors of which the registration deviation is within the first error range, selects one of the number of colors having the lowest registration deviation as the color registration reference, and forms a rear detection mark with respect to the color registration reference in addition to the rear detection marks corresponding to the any color.

26. A color registration method of an image forming apparatus, the method comprising:
forming front detection marks corresponding to starting positions of a plurality of colors;
determining whether there exists any color of which the front detection marks are positioned beyond a first error range, and if so:
forming first rear detection marks corresponding to ending positions only with respect to the any color; and
adjusting the starting and/or ending positions of the any color based on the position of the first rear detection marks relative to a color registration reference.

27. The method of claim 26, further comprising:
calculating a registration deviation among the plurality of colors based on the position of the front detection marks;
determining the number of colors of which the registration deviation is within the first error range;
selecting one of the number of colors having the lowest registration deviation as the color registration reference; and
forming a rear detection mark with respect to the color registration reference in addition to the rear detection marks corresponding to the any color of which the front detection marks are positioned beyond the first error range.

28. An image forming apparatus, comprising:
a transfer belt;
an image forming unit to form a plurality of detection marks corresponding to a plurality of color images on the transfer belt; and
a control unit to control color registration of at least one of the plurality of color images according to a characteristic of the detection marks corresponding to the at least one color except at least one of the other colors.

29. The image forming apparatus of claim 28, wherein the characteristic of the detection marks comprises a position of the detection marks with respect to a registration reference.

30. The image forming apparatus of claim 29, wherein the characteristic of the detection marks further comprises a distance between two or more detection marks of each color image with respect to the registration reference.

* * * * *